United States Patent [19]

Aschenbrenner et al.

[11] Patent Number: 5,449,229
[45] Date of Patent: Sep. 12, 1995

[54] TAMBOUR DOOR CUSTOMER ACCESS PORT

[75] Inventors: Mike A. Aschenbrenner, Northglenn; John S. Todor, Arvada, both of Colo.

[73] Assignee: Storage Technology Corporation, Louisville, Colo.

[21] Appl. No.: 271,720

[22] Filed: Jul. 7, 1994

[51] Int. Cl.6 ............................................. A47B 81/06
[52] U.S. Cl. ................................. 312/283; 360/92; 221/21; 221/76; 312/305
[58] Field of Search ............... 312/283, 9.29, 9.31, 312/9.46, 9.6, 9.7, 297, 305; 221/6, 21, 76; 360/92

[56] References Cited

U.S. PATENT DOCUMENTS

| | | | |
|---|---|---|---|
| 4,317,604 | 3/1982 | Krakauer | 312/305 X |
| 4,498,603 | 2/1985 | Wittenborg | 221/76 |
| 4,742,405 | 5/1988 | Teranishi | 360/92 |
| 4,839,758 | 6/1989 | Honjoh | 360/92 X |
| 4,927,051 | 5/1990 | Falk et al. | 221/21 X |
| 5,041,929 | 8/1991 | Fryberger et al. | 360/92 |
| 5,237,468 | 8/1993 | Ellis | 360/92 |
| 5,277,534 | 1/1994 | Anderson et al. | 360/92 X |

Primary Examiner—Jose V. Chen
Assistant Examiner—Rodney B. White
Attorney, Agent, or Firm—Duft, Graziano & Forest

[57] ABSTRACT

A Customer Access Port (CAP) for an automated storage library subsystem which comprises two sliding doors to control operator access to the library. A magazine adapted to hold several storage media cartridges is positioned inside the storage library accessible to both an operator and the robotic mechanism for exchanging storage media cartridges between the operator and the storage library. Both sliding doors are slid between two positions by manual movement of a single knob. In one position, a first door closes to prevent any operator access to the magazine as well as other components inside the library while the second door opens to permit robotic mechanisms inside the library to manipulate storage media cartridges in the magazine. In the second position, the first door opens to permit operator access to the magazine while the second door closes to restrict the operator from accessing other components such as the robotic mechanisms or inventoried storage media cartridges within the library.

4 Claims, 9 Drawing Sheets

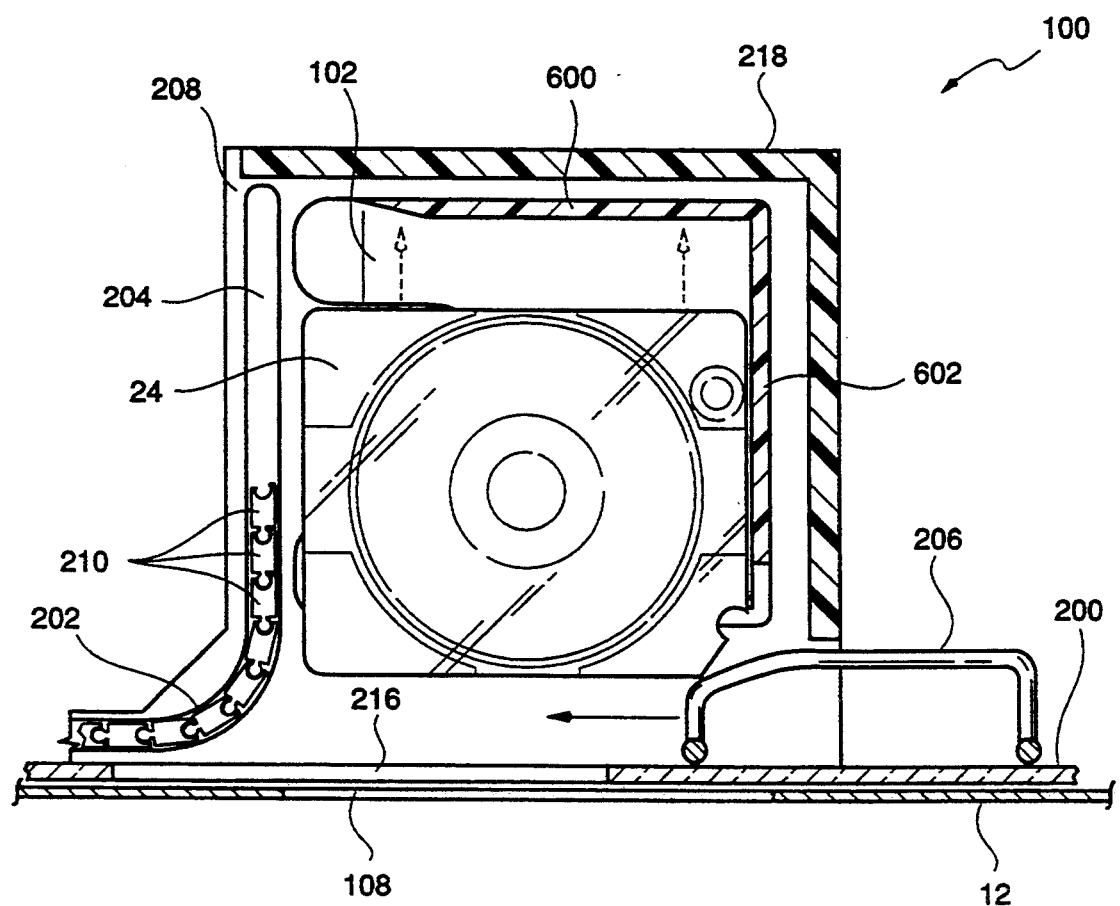

TAMBOUR DOOR CUSTOMER ACCESS PORT

FIELD OF THE INVENTION

This invention relates generally to data storage and retrieval systems, and more particularly to an improved method and apparatus for entering storage media cartridges containing computer-readable media into an automated storage library subsystem.

PROBLEM

Storage library subsystems are known to provide cost effective storage for large volumes of information in computer system applications. Such library subsystems typically include one or more read/write electronic devices used to record and retrieve information on storage media cartridges. In addition, storage library subsystems include a plurality of inventory storage locations for holding storage media cartridges not currently being processed in a read/write electronic device. The storage locations within the storage library subsystem are typically slots adapted to hold one storage media cartridges in each slot. A typical storage library subsystem further includes robotic mechanisms to controllably move storage media cartridges between read/write devices and the inventory slots. The robotic mechanisms are moved by control electronics and servo devices within the library subsystem to retrieve a storage media cartridge in response to a request from an attached host computer system. The retrieved storage media cartridge is then moved from its inventory location to a read/write device for processing, or moved from a read/write device back to its inventory location after processing is completed.

The control electronics in the storage library subsystem automatically maintains inventory information regarding the current location of each storage media cartridge in the inventory locations of the library. This inventory information is used to quickly locate a storage media cartridge requested for processing by a host computer system. To help assure the integrity of this automated inventory and to prevent harm to the operator by the robotic mechanisms, storage library subsystems typically enclose the robotic mechanisms and inventory locations to prevent inadvertent operator access to the robotic mechanisms or the inventoried storage media cartridges.

It is known to provide a Customer Access Port (CAP) to permit controlled access by the operator for purposes of adding or removing storage media cartridges in the storage library subsystem. An operator's access to the storage media cartridges is restricted by the library subsystem to prevent harm to the operator and to assure integrity of the inventory control of the library subsystem. The operator may only access storage media cartridges in the storage library through the controlled CAP. Similarly, storage media cartridges are added to the library only through the operator's access to the CAP.

Customer Access Ports of prior designs have added significant complexity to the storage library subsystem. In some cases, the CAP mechanism is itself another robotic control mechanism which moves storage media cartridges into, or out of, the storage library subsystem. The number of moving parts or precision components of prior CAP designs adds complexity and cost of the library and may decrease the reliability of the CAP mechanism. Such an additional robotic control mechanism adds complexity independent of the robotic mechanisms used to move storage media cartridges between inventory locations and the read/write electronic devices.

SOLUTION

The present invention solves the problems addressed by other CAP designs but does so with less complexity. The present invention comprises apparatus and methods for a CAP which reduces the number of moving parts and eliminates the need for complex control mechanisms to restrict operator access to the storage media cartridges or the robotic mechanisms inside the storage library subsystem.

The CAP of the present invention comprises two sliding doors and a magazine for holding storage media cartridges as they are moved into, or out of, the storage library subsystem. The magazine comprises a plurality of substantially rectangular slots for holding storage media cartridges. Each slot in the magazine is open on two of its four sides. The opening on one side of each slot is permanently aligned with an opening in the cover panels of the storage library subsystem. An operator may insert storage media cartridges into, or remove storage media cartridges from, the magazine through the opening in the cover panels of storage library subsystem. The opening on another side of each slot is aligned to permit the robotic mechanism inside the storage library subsystem to insert storage media cartridges into, or remove storage media cartridges from, the slots of the magazine. To remove storage media cartridges from the storage library subsystem, an operator requests that the library subsystem retrieve the desired storage media cartridges using the robotic mechanism within the library and insert the storage media cartridges into slots in the magazine. The operator may then remove the storage media cartridges through the opening in the library cover panels which is aligned with the slots of the magazine. Conversely, to add storage media cartridges to the library, an operator inserts the desired storage media cartridges into slots of the magazine through the opening in the cover panels of the library subsystem. The operator then requests that the library subsystem use its robotic mechanisms to retrieve the storage media cartridges from the slots of the magazine and transfer the storage media cartridges to inventory locations within the library.

The sliding doors of the present invention are cooperatively interlocked to restrict access by the operator to the storage media cartridges in the inventory locations within the storage library subsystem. In addition, the sliding doors are designed to reduce the possibility of harm to the operator by restricting access by the operator to the robotic mechanisms inside the storage library subsystem. The sliding doors are interlocked with one another such that they are both moved by the sliding motion of a single knob. The sliding doors may be slid between two positions. In the first position, one door covers the opening in the cover panels of the storage library subsystem to prevent operator access to the slots of the magazine. Simultaneously the other door is positioned to permit the robotic mechanism within the storage library subsystem to access the slots in the magazine. In this first position the operator is prevented from accessing the storage media cartridges or the robotics within the storage library subsystem. When slid to the second position, the door which previously covered the opening in the panels is opened to permit the operator to access the slots in the magazine. Simultaneously the other door is closed to restrict the operator from accessing the robotic mechanisms or the inventory of storage media cartridges within the storage library subsystem. In addition, this second position of the doors helps prevent storage media cartridges from falling into the library mechanism while the operator is manipulating them in the slots of the magazine.

The CAP of the present invention restricts the operator access to storage media cartridges in the storage library subsystem, reduces the possibility of harm to the operator by restricting operator access to the robotic mechanisms inside the storage library subsystem, and does so in a simple design with a small number of moving pans. Two sliding doors and the associated connecting knob are the only moving parts of the present invention.

BRIEF DESCRIPTION OF THE DRAWING

FIG. 6 shows one of the bails associated with a door of the CAP of FIG. 1 forcing a storage media cartridge fully into its slot;

DETAILED DESCRIPTION OF THE INVENTION

Library Overview

Figure 1:
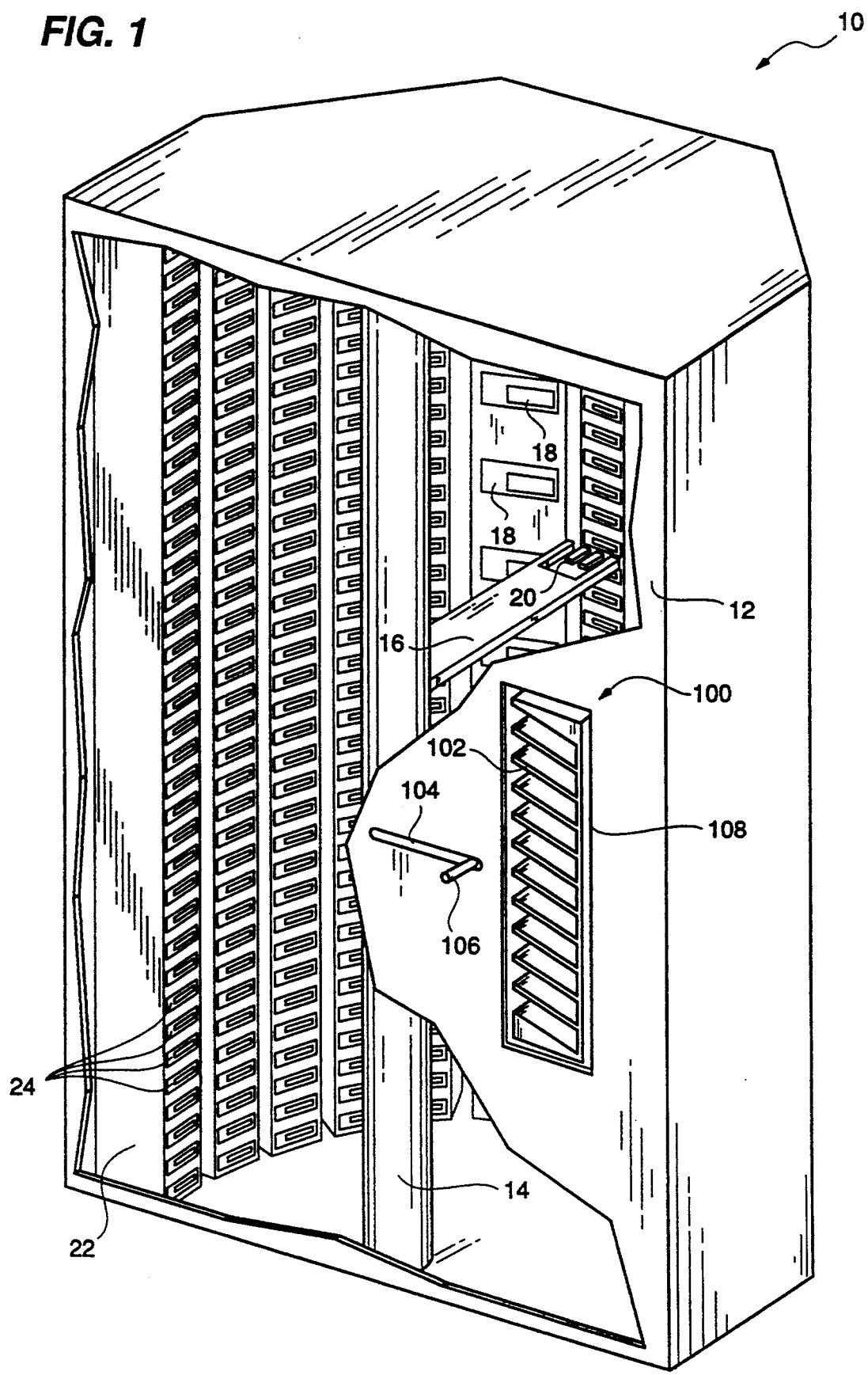
FIG. 1 shows a storage library subsystem which utilizes a Customer Access Port (CAP) of the present invention.

FIG. 1 shows storage library subsystem 10 which comprises Customer Access Port (CAP) 100 of the present invention. Storage library subsystem 10 is shown with its front cover 12 partially cut away to permit viewing of components inside the library. A plurality of racks 22 are arranged inside library 10 in a semicircle around the perimeter of the library. Each rack 22 comprises a plurality of slots adapted to hold one storage media cartridge 24 in each slot. A plurality of read/write electronic devices 18 are positioned in a column within library 10. Each read/write electronic device 18 is capable of recording or retrieving information on a storage media cartridges 24.

Robot arm 16 slides and pivots on z-axis 14 under the control of library electronics (not shown). Robot arm 16 pivots on z-axis 14 under the control of library electronics to align with a desired rack 22 or to align with the column of read/write electronic devices 18. Additionally, robot arm 16 moves vertically up and down sliding on z-axis 14 to vertically align with a particular slot in a rack 22 or with a particular one of read/write electronic devices 18. Robot arm 16 also aligns with slots in magazine 102 by sliding and pivoting on z-axis 14.

Gripper hand 20 is positioned at the end of robot arm 16 and is controlled by library electronics (not shown). Gripper hand 20 controllably extends and retracts from the end of robot arm 16. In addition, jaws (not shown) at the end of gripper hand 20 controllably grip or release one of storage media cartridges 24. Combinations of the vertical and rotational movement of robot arm 16 permit gripper hand 20 to be aligned with any slot in racks 22, with any of read/write electronic devices 18, or with any slot in magazine 102. Through controlled movement of robot arm 16, extension of gripper hand 20 and gripping of a storage media cartridge 24 by the jaws (not shown) of gripper hand 20, any storage media cartridge 24 may be moved between a slot in a rack 22 and any of read/write electronic devices 18.

Access by an operator to components within storage library subsystem 10 is limited to the cartridges accessible through CAP 100. This limited access serves two purposes. First, the limited access helps to prevent harm to the operator caused by interference with the operation of robot arm 16 and gripper hand 20. The operator is restricted frown accessing the inside of library 10 in such a way as to interfere with the operation of robot arm 16 and gripper hand 20. Second, the operator is prevented from accessing the storage media cartridges 24 stored in slots of racks 22 within storage library subsystem 10. Library control electronics (not shown) maintain inventory information to rapidly locate each storage media cartridge 24 stored in slots of racks 22. CAP 100 serves to prevent the operator from accessing these inventory controlled storage media cartridges 24 within storage library subsystem 10.

CAP—Magazine

Magazine 102 provides limited access by an operator to permit the operator to insert or remove storage media cartridges 24 in storage library subsystem 10. An operator adds storage media cartridges 24 to storage library subsystem 10 by inserting the new cartridges into magazine 102. Robot arm 16 and gripper hand 20 are then actuated by library control electronics (not shown) to move the new cartridges from magazine 102 into slots in racks 22. An operator removes storage media cartridges 24 from library 10 by requesting of the library that it retrieve the desired storage media cartridges 24 from slots in racks 22 and move them into the slots of magazine 102. The operator then removes the retrieved storage media cartridges 24 from magazine 102.

Slots in magazine 102 of CAP 100, like the slots in racks 22, are each adapted to hold one storage media cartridge 24. Vertical and rotational movement of robot arm 16 coupled with extension, gripping, and releasing by gripper hand 20 can move storage media cartridges 24 into, or out of, slots in magazine 102.

Slots in magazine 102 are open on two sides to permit storage media cartridges 24 to be inserted and removed in either of two directions. The two openings are more clearly visible in the cross-sectional top view of FIG. 6. A cross-section of one slot in magazine 102 is viewed from the top in FIG. 6. Magazine sidewall 600 is shown at the top of FIG. 6 forming one of two closed sides for one slot of magazine 102. The edge of magazine 102 directly opposite magazine sidewall 600 is open to permit an operator to insert or remove a storage media cartridge 24 in the slot. A storage media cartridge 24 is shown partially inserted in the slot through the open end of the slot in magazine 102. Magazine back wall 602 is shown at the right side of FIG. 6 forming the other closed side for one slot of magazine 102. The edge of magazine 102 directly opposite magazine back wall 602 is open to permit the robotic arm 16 and gripper hand 20 to insert or remove a storage media cartridge 24 in the slot.

As shown in the cross-sectional top view of FIG. 6, one opening in a slot of magazine 102 is aligned with robot arm 16 to permit robot arm 16 and robot gripper hand 20 to move storage media cartridges 24 into, or out of, a slot in magazine 102. The second opening in each slot of magazine 102 is aligned with opening 108 in front cover panel 12 of library 10 to permit an operator to move storage media cartridges into, or out of, a slot in magazine 102 through the second opening. An operator accesses a slot in magazine 102 through opening 108 in library front panel 12. An operator adds new storage media cartridges to library 10 by inserting each new storage media cartridges into a slot in magazine 102 through opening 108. The operator then requests library electronics (not shown) to move the new storage media cartridges from the slots in magazine 102 into slots in racks 22 (of FIG. 1) for inventory controlled storage. To remove storage media cartridges from the inventory control of library 10 and operator requests that library electronics (not shown) retrieve the desired storage media cartridges 24 from slots in racks 22 (of FIG. 1) and deposit each in a slot in magazine 102. The operator then removes the storage media cartridges from magazine 102 through opening 108.

CAP—Doors

Knob 106 is shown in FIG. 1 in it rightmost position. Two doors (not shown in FIG. 1) are attached to knob 106. As knob 106 is moved left or right in slot 104, the doors move with knob 106. A first of the two doors (not shown in FIG. 1) slides left to cover opening 108 when knob 106 is moved left in slot 104. When opening 108 is covered by the first door (not shown) operator access to the inside of library 10 is prevented. A second of the two doors (not shown in FIG. 1) prevents the operator from interfering with operation of robot arm 16 inside library 10 while knob 106 is in its rightmost position. The operator is permitted to access only the slots of magazine 102 when opening 108 is not covered and knob 106 is moved to the extreme right in slot 104 (as shown in FIG. 1).

Figure 2A:
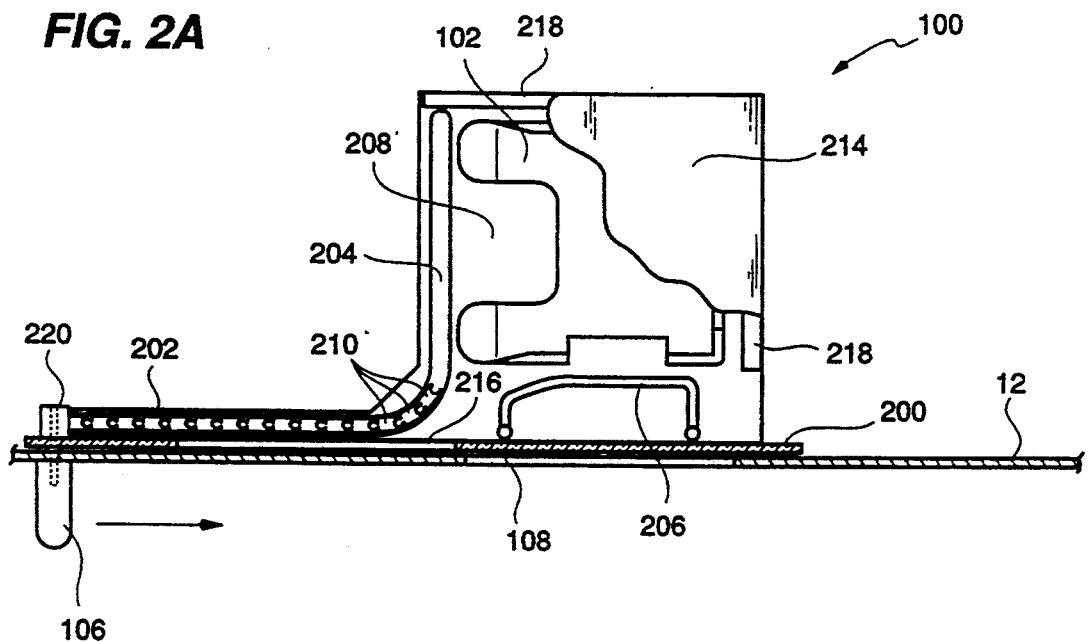
FIG. 2a shows a top view of the CAP of FIG. 1 with its doors positioned to prevent operator access inside the storage library subsystem.
Figure 2B:
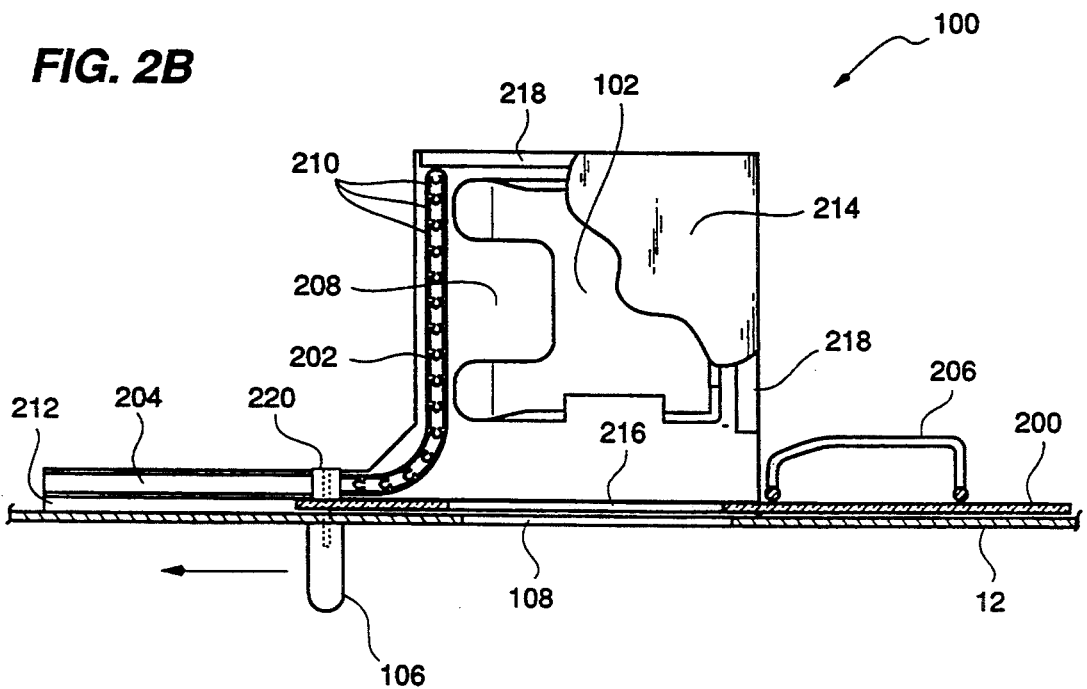
FIG. 2b shows the same top view as FIG. 2a but with the doors positioned to permit operator access to the slots of the magazine but not to the storage media cartridges or robotics inside the storage library subsystem.
Figure 8:
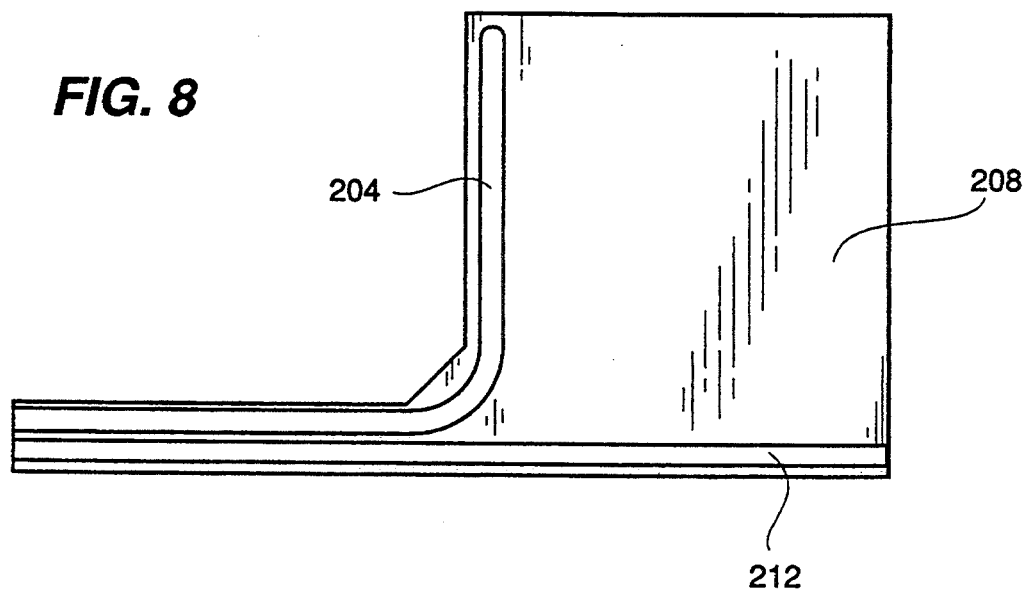
FIG. 8 shows additional detail of slots in which sliding doors of the CAP of FIG. 1 are adapted to slide.

FIGS. 2a and 2b show a top view of CAP 100 (with a top portion partially cut away for clarity). Bottom frame member 208 has curved door slot 204 and straight door slot 212 (visible only in FIG. 2b). Top frame member 214 (partially cut away for clarity) mirrors the shape of bottom frame member 208 including curved door slot 204 and straight door slot 212 (not shown in the cutaway portion of top frame member 214). FIG. 8 shows in greater detail bottom frame member 208 with straight door slot 212 and curved door slot 204. As discussed above, top frame member 214 mirrors the design of straight door slot 212 and curved door slot 204. As shown in FIGS. 2a and 2b, bottom frame member 208 and top frame member 214 are attached to front cover panel 12 to position and secure CAP 100 with respect to other components of library 10. Side frame members 218 are attached to top and bottom frame members 214 and 208 and serve to restrict operator access to the inside of library 10.

Figure 9:
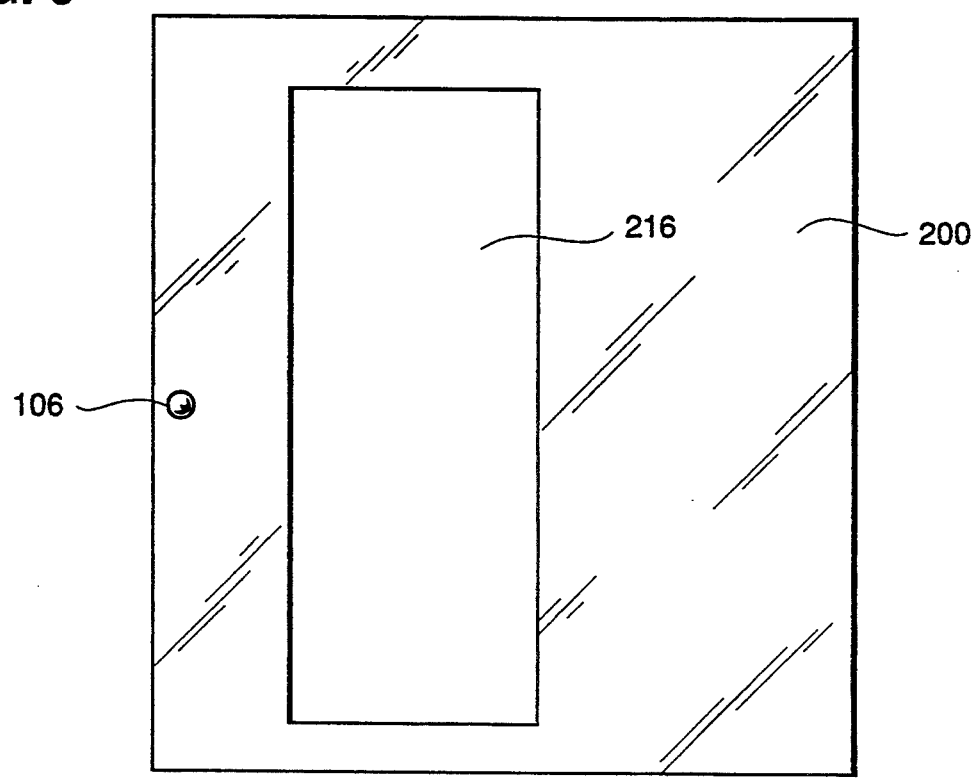
FIG. 9 shows additional detail of one door of the CAP of FIG. 1 with a hole which permits operator access to the cartridges in the CAP.

Door 200 is engaged with, and slides within, straight door slot 212 in both bottom frame member 208 and top frame member 214. Tambour door 202 is engaged with, and slides within, curved door slot 204 in both bottom frame member 208 and top frame member 214. Door 200 comprises a flat, rectangular panel with rectangular hole 216 cut from its middle portion. FIG. 9 shows a detailed front view of door 200 with hole 216 and attached knob 106. Tambour door 202 of FIG. 2a is comprised of a plurality of vertically oriented members 210 which extend between curved slots 204 in each of top and bottom frame members 214 and 208 respectively. The vertically oriented members 210 are joined one to another in a manner which serves as a hinge between members. This hinging action between vertical members permits the tambour door to follow the curved path of curved door slot 204 as it slides in the slots. Assembly and materials appropriate to construct such a flexible door are well known in the art. For example, the sliding top of a "roll-top" desk is similar in design to tambour door 202 of the present invention.

Door 200 and tambour door 202 are both attached at their left ends to knob 106 by knob backing 220. In FIG. 2a, knob 106 is shown at its leftmost position in slot 104 (of FIG. 1) to prevent operator access to any components inside library 10 of FIG. 1. In FIG. 2b, knob 106 is shown at its rightmost position in slot 104 (of FIG. 1) to permit operator access to the slots in magazine 102 through opening 108 in front cover panel 12. Knob 106 couples the movement of door 200 and tambour door 202 such that both doors are moved right or left as knob 106 is move left and right respectively. As knob 106 is moved between its leftmost and rightmost positions in slot 104 (of FIG. 1), door 200 and tambour door 202 are moved left and right in straight door slot 212 and curved door slot 204 respectively. Rectangular hole 216 in door 200 is approximately the same size as opening 108 in front cover panel 12. Hole 216 must be aligned with opening 108 for an operator to access storage media cartridges in magazine 102 through opening 108 and through hole 216. Hole 216 is aligned with opening 108 when door 200 is moved to its rightmost position to permit operator access to magazine 102 through opening 108 and hole 216.

When knob 106 is moved to its leftmost position (as shown in FIG. 2a), hole 216 in door 200 is moved leftward, out of alignment with opening 108, so that opening 108 is covered by door 200. Tambour door 202 also moves to its leftmost position when knob 106 is moved leftward (as shown in FIG. 2a). In this leftmost position, tambour door 202 is retracted to permit robot arm 16 and gripper hand 20 (both of FIG. 1 ) to insert or remove storage media cartridges in the slots of magazine 102 through the left side opening of each slot in magazine 102. Simultaneously, door 200 is positioned to cover opening 108 to prevent operator access to magazine 102 or any components inside library 10.

When knob 106 is moved to its rightmost position (as shown in FIG. 2b), door 200 is moved to the right and tambour door 202 is forced to the right and around curved door slot 204. In its rightmost position, door 200 is positioned so that hole 216 aligns with opening 108 to permit operator access to magazine 102. In its rightmost position, tambour door 202 meets with side frame member 218 to restrict access by the operator to robot arm 16 or racks 22 (both of FIG. 1) within library 10. This position permits an operator to insert or remove storage media cartridges in slots in magazine 102 through opening 108. However, the position of tambour door 202 prevents the operator from interfering with continued operation of robot arm 16 and gripper hand 20 and prevents the operator from accessing storage media cartridges 24 in inventory controlled slots of racks 22.

Bails 206 assure that storage media cartridges remain seated within the slots of magazine 102 when door 200 is moved to its leftmost position. Details of the design and operation of bails 206 are discussed below.

Figure 3A:
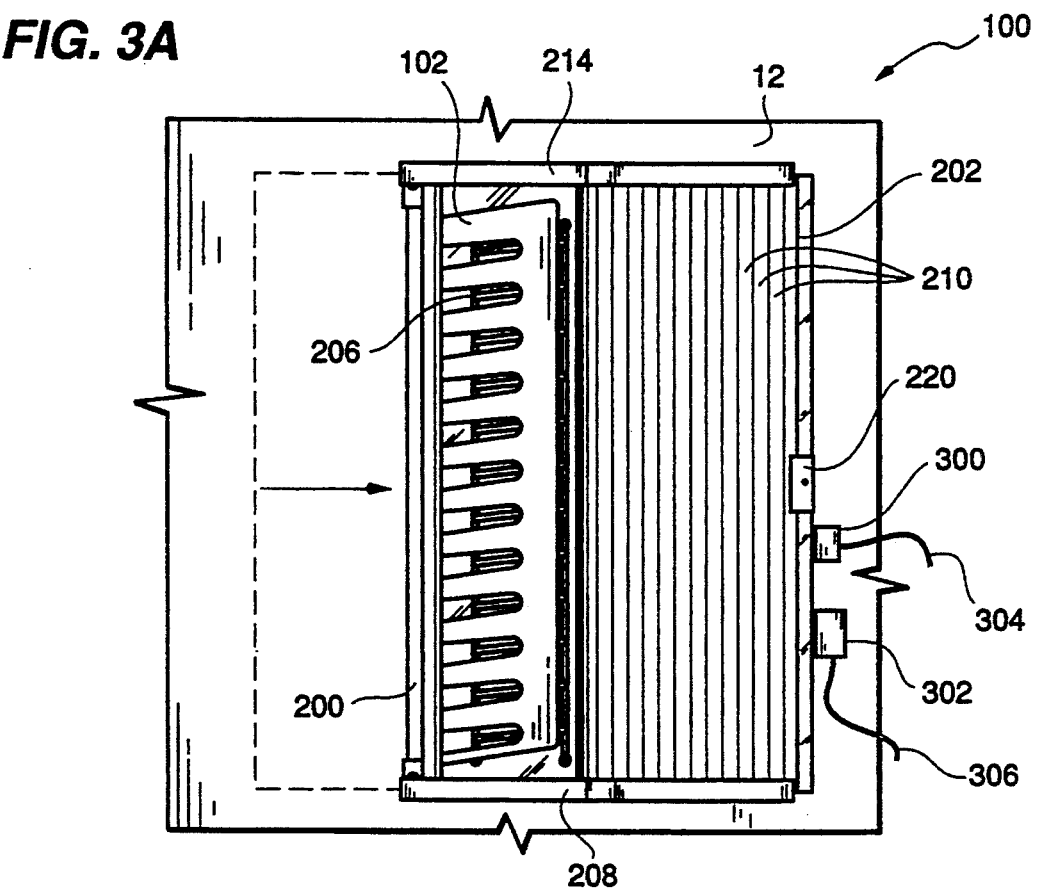
FIG. 3a shows a back side view of the CAP of FIG. 1 with its doors positioned to prevent operator access inside the storage library subsystem.
Figure 3B:
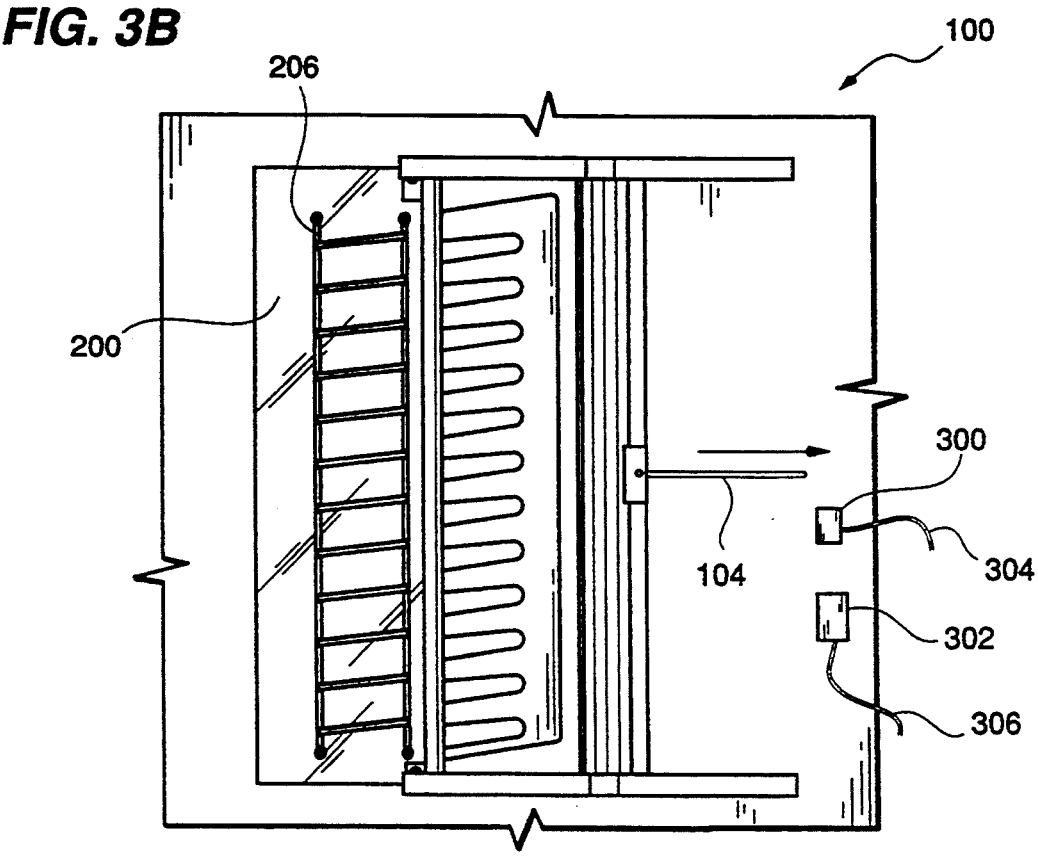
FIG. 3b shows the same back side view as FIG. 3a but with the doors positioned to permit operator access to the slots of the magazine but not to the storage media cartridges or robotics inside the storage library subsystem.

FIGS. 3a and 3b show a back side view of CAP 100 with side frame members 218 removed for clarity. In FIG. 3a, knob backing 220 (connected to knob 106 shown in FIG. 2a) is positioned at one extreme in slot 104 (not visible in FIG. 3a) to prevent operator access to any components inside library 10 of FIG. 1. In FIG. 3b, knob backing 220 is positioned at its opposite extreme position in slot 104 to permit operator access to the slots in magazine 102 through opening 108 (of FIG. 1) in front cover panel 12.

FIG. 3a shows tambour door 202 moved to its rightmost position to permit robot arm 16 and gripper hand 20 (of FIG. 1) to manipulate storage media cartridges in magazine 102 through the opening in the, fight side of each slot in magazine 102. Door 200 (not visible in FIG. 3a) is positioned to cover opening 108 in front cover 12. These positions of door 200 and tambour door 202 prevents operator access to the slots of magazine 102 while robot arm 16 and gripper hand 20 (of FIG. 1) manipulate cartridges in the slots of magazine 102. FIG. 3b shows tambour moved to its leftmost position to restrict operator access to components within library 10. Door 200 is in its leftmost position to align hole 216 with opening 108 (not shown in FIG. 3b). These positions of door 200 and tambour door 202 permit the operator to manipulate storage media cartridges in slots of magazine 102 but restrict the operators access to other components within library 10. FIG. 3b additionally shows members 210 of tambour door 202 spanning the height between top frame member 214 and bottom frame member 208 to restrict operator access inside library 10.

FIGS. 3a and 3b show lock mechanism 300 and door sensor 302 attached to front cover panel 12. Sensor 302 senses that door 200 is fully closed when door 200 is positioned at an extreme position as shown in FIG. 3a. In this position, door 200 covers opening 108 to prevent the operator from accessing the inside of library 10. Sensor 302 applies a signal to conductor 306 when door 200 is sensed in the position shown in FIG. 3a. Library electronics (not shown) senses the signal applied to conductor 306 to determine that door 200 is covering opening 108 and that robot arm 16 and gripper hand 20 (both of FIG. 1) may safely manipulated storage media cartridges 24 in magazine 102 without risk of harm to the operator. Library electronics also applies a signal on conductor 304 to lock mechanism 300 to lock door 200 in the closed position to cover opening 108. Lock mechanism 300 and sensor 302 permit library electronics (not shown) to operate robot arm 16 and gripper hand 20 without interference from, or harm to, an operator manipulating storage media cartridges 24 in magazine 102 through opening 108.

Figure 4A:
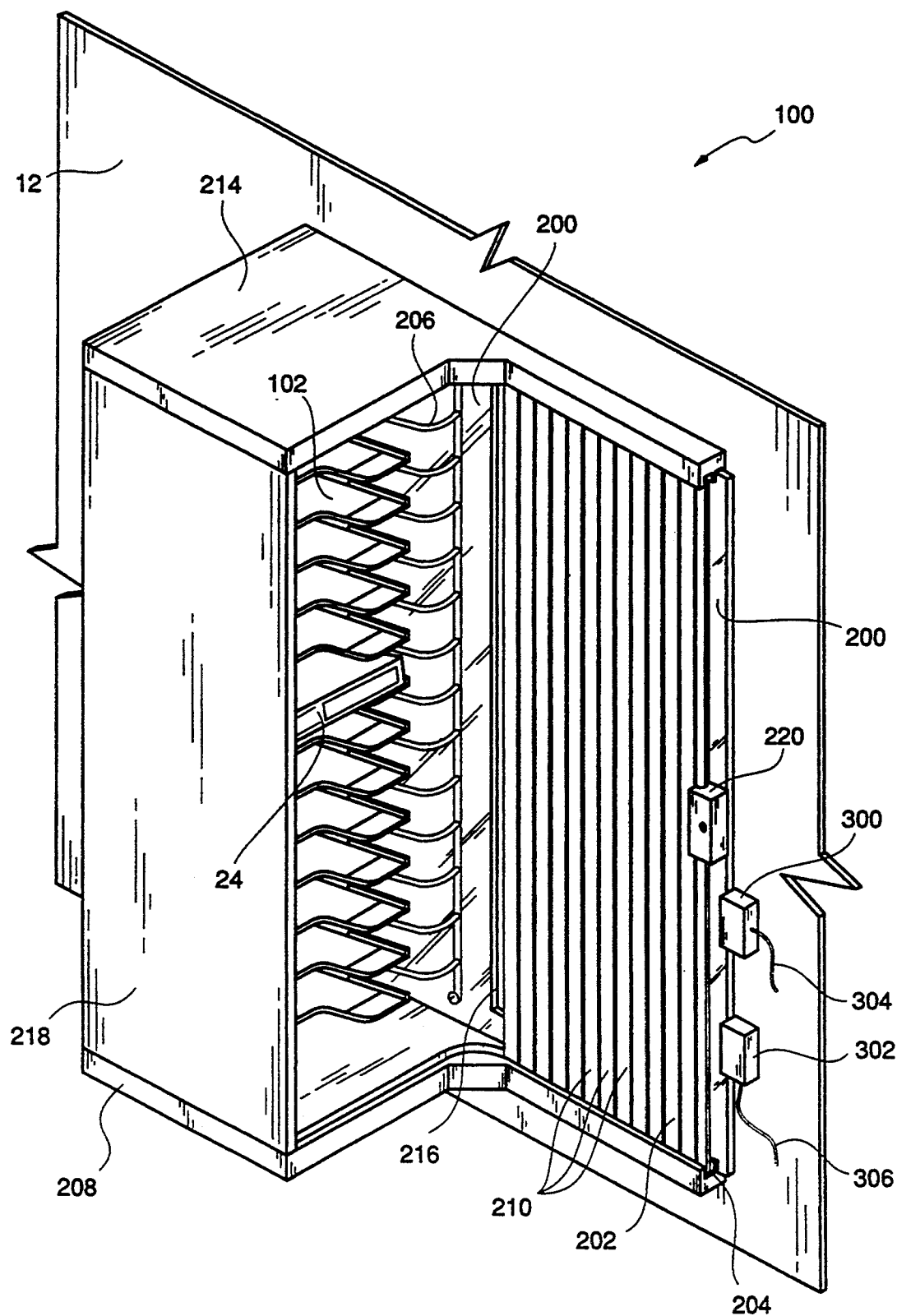
FIG. 4a shows a back side perspective view of the CAP of FIG. 1 with its doors positioned to prevent operator access inside the storage library subsystem.
Figure 4B:
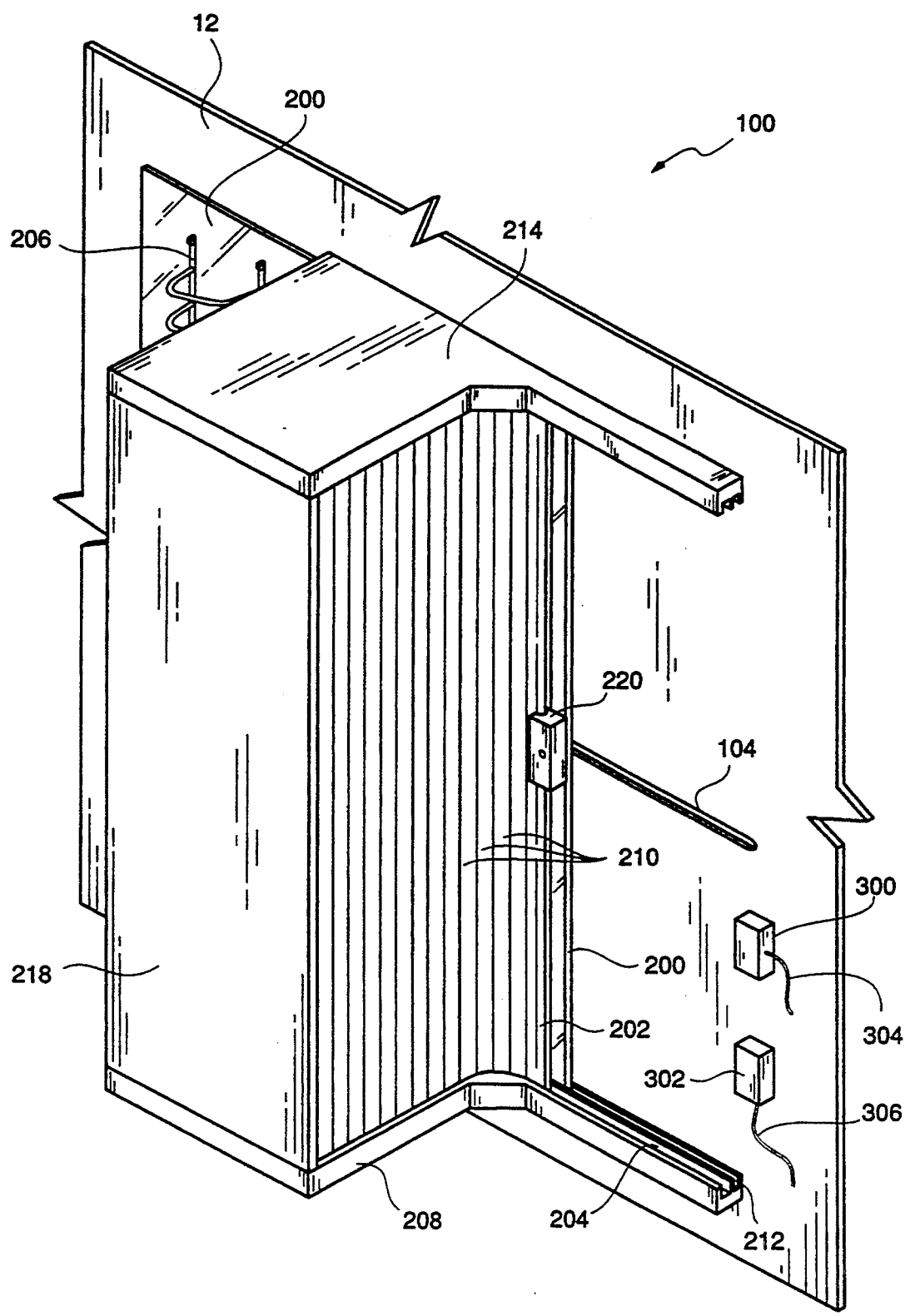
FIG. 4b shows the same back side perspective view as FIG. 4a but with the doors positioned to permit operator access to the slots of the magazine but not to the storage media cartridges or robotics inside the storage library subsystem.

FIGS. 4a and 4b show a back side perspective view of CAP 100. In FIG. 4a, knob backing 220 (connected to knob 106 shown in FIG. 2a) is positioned at one extreme position in slot 104 (not visible in FIG. 4a) to prevent operator access to any components inside library 10 of FIG. 1. In FIG. 4b, knob 106 is positioned at its opposite extreme position in slot 104 to permit operator access to the slots in magazine 102 through opening 108 in front cover panel 12 (of FIG. 1).

FIG. 4b shows tambour door 202 in a closed position abutting side frame member 218 to restrict operator access to components inside library 10. Door 200 is simultaneously positioned to align hole 216 with opening 108 (of FIGS. 2a and 2b) when tambour door 202 is closed as shown in FIG. 4b. FIG. 4a shows tambour door 202 in an open position to permit robot arm 16 and gripper hand 20 (of FIG. 1) to insert or remove storage media cartridges 24 in magazine 102. Door 200 is simultaneously positioned to cover opening 108 (of FIGS. 2a and 2b) when tambour door 202 is open as shown in FIG. 4a.

Figure 5A:
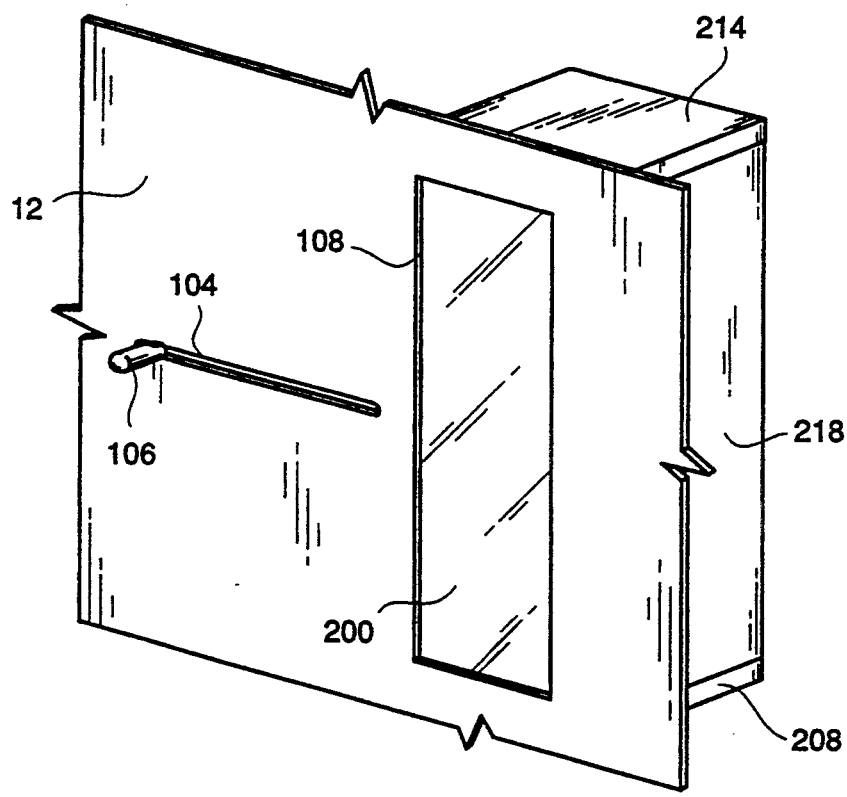
FIG. 5a shows a front side perspective view of the CAP of FIG. 1 with its doors positioned to prevent operator access inside the storage library subsystem.
Figure 5B:
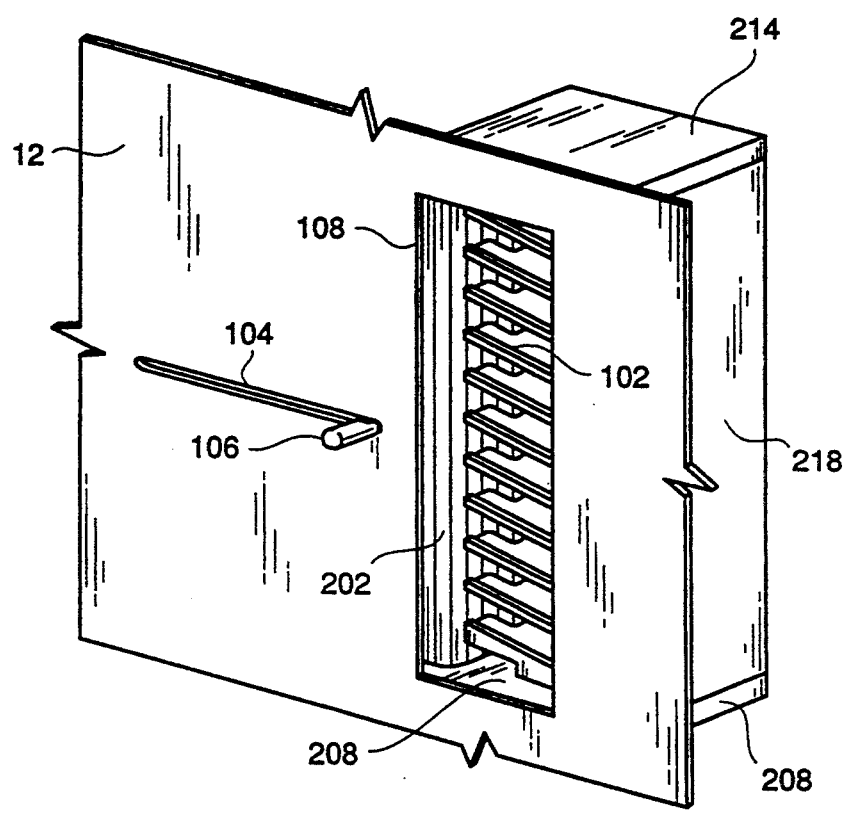
FIG. 5b shows the same front side perspective view as FIG. 5a but with the doors positioned to permit operator access to the slots of the magazine but not to the storage media cartridges or robotics inside the storage library subsystem.

FIGS. 5a and 5b show a front side perspective view of CAP 100. In FIG. 5a, knob 106 is positioned at one extreme position in slot 104 to prevent operator access to any components inside library 10 of FIG. 1. In FIG. 5b, knob 106 is positioned at its opposite extreme position in slot 104 to permit operator access to the slots in magazine 102 through opening 108 in front cover panel 12.

FIG. 5a shows door 200 positioned by knob 106 to cover opening 108. Tambour door 202 (not shown in FIG. 5a) is positioned to permit robot arm 16 and gripper hand 20 (of FIG. 1) to manipulate storage media cartridges in magazine 102 when door 200 covers opening 108 (as described above with reference to FIG. 4a). Door 200 is slid to the right in FIG. 5b (therefor not shown) to permit operator access to magazine 102. In this open position of door 200, tambour door 202 is shown to be simultaneously closed to restrict operator access to other components within library 10.

CAP—Bails

Bails 206 are shown in additional detail in operation in FIG. 6. Bails 206 are attached to door 200. Each individual bail 206 is positioned on door 200 to interact with a storage media cartridge 24 in each slot of magazine 102. Bails 206 serve two purposes as designed.

First, they help retain storage media cartridges 24 within the slots of magazine 102. In FIGS. 2a, 3a, 4a, and 5a, door 200 is shown covering opening 108. Each bail 206 is positioned at the opening in each slot of magazine 102 adjacent opening 108. This position of bails 206 helps retain a storage media cartridge 24 within the slot of magazine 102 preventing the cartridge from slipping out of its slot in magazine 102. Second, bails 206 help prevent an operator from moving door 200 to cover opening 108 with one or more storage media cartridges 24 partially inserted in a corresponding slot of magazine 102. FIG. 6 shows door 200 partially moved to the left to cover opening 108. The left end of each bail 206 is beveled such that when it contacts storage media cartridge 24 as shown in FIG. 6, the cartridge is forced fully into its corresponding slot in magazine 102.

Figure 7:
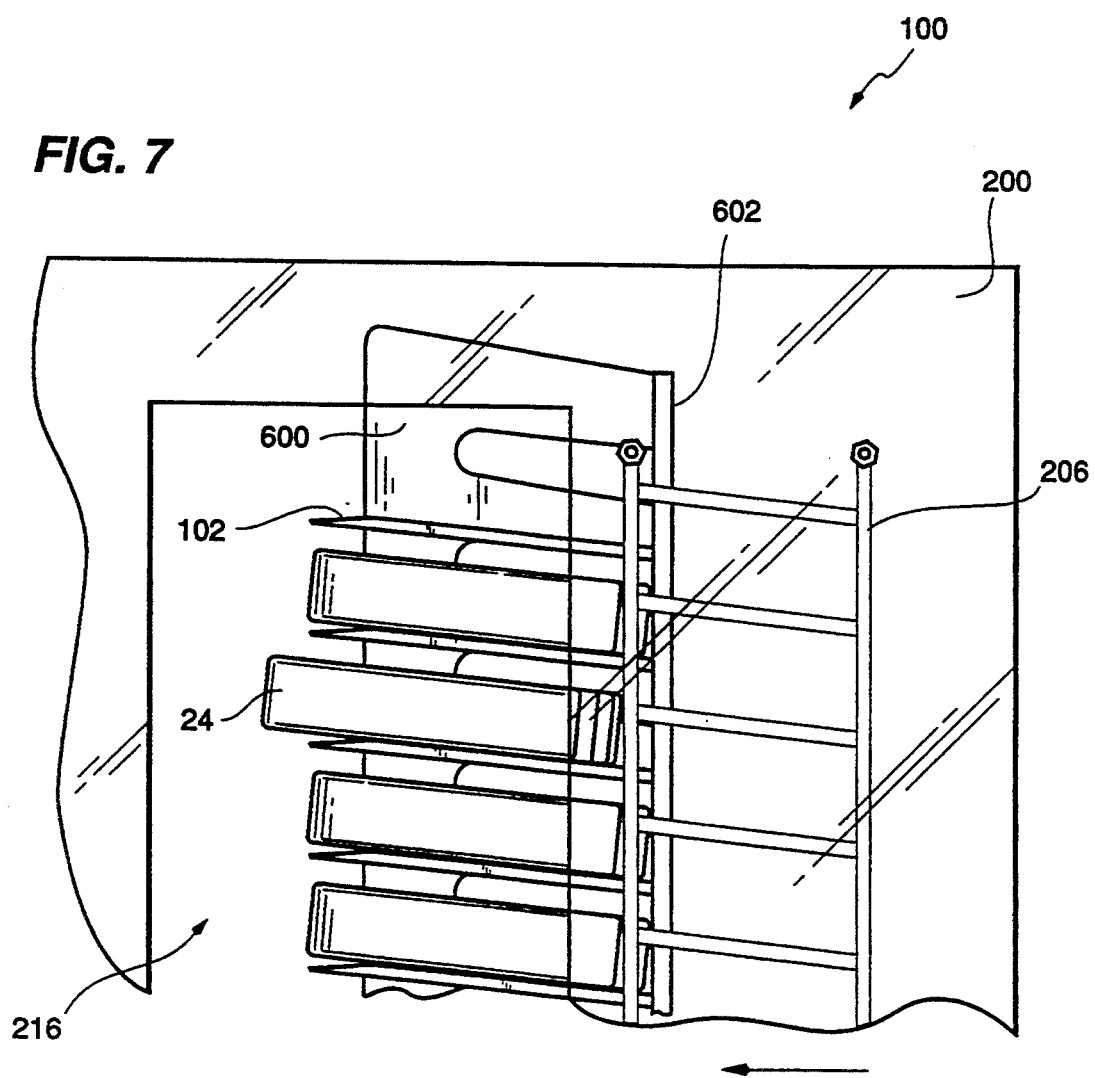
FIG. 7 shows one of the bails associated with a door of the CAP of FIG. 1 interacting with a partially seated cartridge to prevent the door from closing.

FIG. 7 shows a front view of door 200 with attached bails 206 operating to prevent closure of door 200. Bails 206 serve to force a partially seated storage media cartridge fully into its corresponding slot in magazine 102 as depicted in FIG. 6. However, in more extreme conditions of an unseated cartridge, bails 206 cannot force the cartridge into its slot, but rather are operative to prevent door 200 from fully closing. Storage media cartridge 24 of FIG. 7 is unseated from is corresponding slot in magazine 102 so that bail 206 contacts it first on the top side of the cartridge. The angle of partially seated storage media cartridge 24 and bail 206 serve to block further leftward travel of bail 206. As shown in FIG. 7 bails 206 prevent door 200 from closing fully when a storage media cartridge 24 is unseated to an extreme degree. This operation of bails 206 forces the operator to correct the problem before door 200 can be fully closed and normal operation of library 10 resumed.

We claim:

1. In a storage library subsystem having an inside substantially enclosed by an outer cover and utilizing robotic means to manipulate a plurality of storage media cartridges within said storage library subsystem, a customer access port for permitting limited access by an operator to the inside of said storage library subsystem for purposes of inserting or removing said storage media cartridges in said storage library subsystem, said customer access port comprising:

magazine means attached to the inside of said storage library subsystem for temporarily holding storage media cartridges to be exchanged between an operator and said storage library subsystem; and sliding door means mounted on said outer cover and movable between a first position for preventing an operator from accessing the inside of said storage library subsystem while permitting said robotic manipulation means to exchange said storage media cartridges in said magazine means, and a second position for preventing said robotic manipulation means from manipulating said storage media cartridges in said magazine means while simultaneously permitting an operator to access said storage media cartridges in said magazine means through said outer cover, said sliding door means comprising:

a first door means movable between a first position for permitting said robotic manipulation means to manipulate said storage media cartridges in said magazine means and a second position for preventing said robotic manipulation means from manipulating said storage media cartridges in said magazine means;

a second door means movable between a first position for preventing an operator from accessing the inside of said storage library subsystem, and a second position for permitting an operator to access said storage media cartridges in said magazine means; and coupling means for connecting said first door means to said second door means such that both said first door means and said second door means move in unison between said first position and said second position.

2. The customer access port of claim 1 further comprising:

sensor means for indicating that said door means is positioned at said first position preventing an operator from accessing the inside of said storage library subsystem.

3. The customer access port of claim 1 further comprising:

lock means for controllably retaining said door means in said first position preventing an operator from accessing the inside of said storage library subsystem.

4. The customer access port of claim 3 further comprising:

lock means responsive to said sensor means indicating that said door means is positioned at said first position for controllably retaining said door means in said first position preventing an operator from accessing the inside of said storage library subsystem.

* * * * *